3,173,803
SHRINK RESISTANCE OF WOOL BY COATING WITH FIBROUS BOEHMITE
Manuel A. Thomas, Spartanburg, S.C., assignor to Deering Milliken Research Corporation, Spartanburg, S.C., a corporation of Delaware
No Drawing. Filed Feb. 6, 1961, Ser. No. 87,111
6 Claims. (Cl. 117—141)

This invention relates to a process for improving the shrink resistance of woolen material.

Many efforts have been made to improve the shrink resistance of woolen materials but most often, the agents utilized in improving this property are toxic, odor producing or difficult to apply. With many of these reagents, elaborate quality control procedures are required to provide optimum shrink resistance. Most importantly, however, these reagents, even under optimum conditions, often deleteriously affect the hand and strength properties of the material.

It is an object of this invention to provide an easily controlled process for improving the shrink resistance of woolen materials which involves the use of a non-toxic, odor-free reagent which may be readily applied to the material.

It is a further object of this invention to reduce the shrinkage of a woolen material without adversely affecting the hand and strength properties of the material, while in some instances, actually enhancing these properties.

These and other objects are accomplished in accordance with this invention by contacting a woolen material with an aqueous medium containing at least about 0.02% by weight of fibrils of alumina monohydrate having the boehmite crystal lattice, said fibrils having adsorbed upon their surfaces as a mono-layer between about 5 and about 15% by weight of acetic acid. The aqueous medium should be maintained at a temperature between about 75° F. and about 220° F. and is preferably adjusted to a pH between about 9 and about 13. Some improvement is provided when the material is treated for any length of time, but significant improvement is obtained only after about 0.5 minute. After treatment with the aqueous medium, the treated material is dried and cured at a temperature between about 150° and about 400° F. for at least about two minutes to provide a material having excellent shrink resistance, strength properties and hand.

In a preferred embodiment of this invention, the aqueous medium is maintained at its boiling point as the woolen material is being treated for at least about one minute, preferably up to about ten minutes. The material is then removed from the aqueous medium, dried and cured at a temperature between about 210° and about 260° F. At this lower temperature range, the material may be cured for any desired length of time. Generally, the longer the curing time, the more permanent will be the shrink resistance of the dried material, so that curing times of about 20 minutes are preferred. A curing period of only about two or three minutes, however, provides good shrink resistance and longer times will be unnecessary unless the material will ultimately be laundered a plurality of times. After curing, the material is preferably given a light warm water rinse to remove residual alkali and alumina.

The aqueous medium containing the alumina monohydrate fibrils may be characterized as either a fine dispersion or a colloidal solution. When the alkaline aqueous medium contains more than about 2% by weight of the fibrils, a highly undesirable gel is produced. In this condition it is extremely difficult to impregnate the woolen material and reduce the shrinking tendencies of the material. It is necessary, therefore, to maintain the concentration of fibrils in the aqueous medium below about 2% by weight. At the preferred pH level of about 12, the fibrils are preferably present in the aqueous medium at a concentration of about 0.03 to about 0.3% by weight, since under these conditions an optimum balance of shrink resistance, permanence, physical properties and economics is provided.

The degree of permanence of shrink resistance is directly proportional to the extent of treatment given the material. For example, with the fibrils present in a boiling aqueous medium at a concentration of about 0.10% by weight with a treating period of 5 to 10 minutes and curing temperatures approaching 260° F. for over 30 minutes, relatively permanent shrink resistance is provided. At temperatures in excess of 260° F., however, and particularly up to about 300° F., the woolen material is yellowed and there is some loss in strength. The hand of the material treated or cured at this high temperature is also not as good as the material treated under less severe conditions. The time of curing also affects these characteristics, as noted above, in that longer times at higher temperatures provide more shrink resistance, but cause progressive yellowing of the material with some degradation of the physical properties.

The pH of the aqueous medium is a most critical aspect of the present invention. At a pH less than about 9, the improvement in shrink resistance is materially less than that provided at the higher pH levels. At a pH level greater than 13, strong yellowing and considerable fiber weakening follows, although the degree of permanence of the shrink resistance is quite high. For most uses, a pH of about 12 is highly preferred. At this level, there is no noticeable yellowing or weakening of the material treated, and the degree of permanence of the shrink resistance is good. Preferably, the pH of the aqueous medium is adjusted within the desired range of about 9 to about 13 prior to immersing the woolen material. While any strong alkali may be used to adjust the pH of the aqueous medium, ammonium hydroxide and the alkali metal hydroxides, such as sodium hydroxide, are preferred.

The aqueous medium may be heated either before or after the woolen material is immersed therein. Good shrink resistance is provided when the aqueous medium is heated to a temperature below 120° F., but the shrink resistance is not permanent. The aqueous medium is preferably heated to the boil, since treatment under this condition provides the optimum ease of control in the process conditions while providing results equivalent to those at lower temperatures, such as 150° F.

Another significant aspect of the present invention is the temperature at which the curing of the treated materials is effected. In general, excellent shrink resistance is provided at any temperature between about 150° and about 400° F. At temperatures in excess of about 260° F., however, the fabric yellow and there is a slight degradation of the physical properties of the material. At temperatures approaching 400° F., the degree of yellowing is greater, as is the magnitude of physical degradation. Even at temperatures below about 150° F., however, some improvement in shrink resistance is provided, although the improvement is not as permanent after several water washings. The period of curing is largely determined by the degree of permanence desired, along with the amount of yellowing and physical degradation which is tolerable. Within the preferred temperature range of 210° to 260° F., excellent shrink resistance with minimal yellowing is provided within about 5 minutes. Obviously, at the lower temperatures longer curing times may be provided, while at the higher temperature ranges the material should be cured for shorter periods. The woolen material is preferably dried at about 75° F. prior to curing for optimum curing effects.

The alumina monohydrate fibrils which are utilized in the process of this invention are available commercially under the trade name of Baymal. A typical fibril composition, such as that used in the following examples, contains 84.7% alumina monohydrate having the boehmite crystal lattice, 8.5% acetic acid, 1.76% sulfate ions and 2.7% water, with traces of sodium, iron, calcium, copper, lead and silicon. In general, these fibrils have an average length in the range of 100 to 700 millimicrons, the remaining average dimensions being in the range of 3 to 10 millimicrons and the axial ratio being from 50:1 to 150:1. The fibrils used in the following examples have a specific surface area of 274 square meters per gram. Additional data concerning these fibrils and their production may be found in U.S. Patent No. 2,915,475.

In the following examples, which illustrate preferred embodiments of the present invention as well as comparisons with unsatisfactory and less preferred processes, parts are by weight unless otherwise indicated.

*Example I*

Alumina monohydrate fibrils, in an excess amount of 3.2 grams, are added to 2400 ccs. of water (30/1 liquor ratio). About 0.05% of a wetting agent sold under the trade name of Surfonic N–95 is added at this point. The pH of this solution is about 5.0. The pH is then adjusted to 12 by the addition of sodium hydroxide and a 100% woolen material weighing 80.0 grams (24″ x 24″) is immersed in the resulting colloidal solution. This solution is then heated to the boil in 20 minutes, while agitating rapidly. The fabric is then removed, padded to remove excess liquor, dried and cured at 250–260° F. for 20 minutes. A light warm water rinse is given the fabric and it is then washed with a detergent sold under the trade name of Tide for 18 minutes in a commercial washing machine. No measurable shrinkage in area occurs after this washing. Even after three washings, and without ironing, only very slight shrinkage (2.7%) occurs. The procedures of this example are repeated except that the aqueous medium is maintained at 120° F. and 160° F., respectively. Good shrink resistance is provided, through the improvement is not quite as marked as when the fabric is treated at the boil. The breaking strength and percent elongation at the break of all three samples are measured after the third wash. The breaking strength of each is substantially retained while the percent elongation is surprisingly materially increased, particularly after the treatment at 160° F.

*Example II*

The procedure of Example I is repeated on four more fabric samples, except that the colloidal solution is maintained at 150° F. during the treatment and the concentration of the solution is adjusted to 0.03%, 0.07%, 0.13% and 0.27%, respectively, for the samples. After the first wash, the fabric samples treated at concentrations of 0.03% and 0.07% shrink slightly in area (0.5–2.7%), while at the higher concentrations no shrinkage whatsoever can be measured. After the third wash, best results are obtained at the higher concentrations. Equivalent results are obtained when the fibrial concentration is raised to 1.8%, although vigorous agitation is required to obtain adequate impregnation of the fabric.

*Example III*

The procedure of Example I is repeated on three more fabric samples, except that the temperature of the colloidal solution is maintained at 150° F. during the treatment and the pH is adjusted to 4, 7 and 12. By far, the best improvement in shrink resistance is obtained at a pH of 12, where no area shrinkage can be measured after the first wash, with only slight shrinkage being measured after the third wash. On the other hand, the samples treated at pH's of 4 and 7 are not improved sufficiently for commercial acceptance. For example, no improvement is noticed at a pH of 4, while the fabric treated at a pH of 7 shrinks about 7% in area after the third wash. Most unexpected increases in breaking strength and percent elongation at the break are noticed in the fabric treated at a pH of 12. For example, whereas the untreated fabric has a breaking strength and percent elongation in the filling of 17.5 lbs. and 40.6%, respectively, these values are increased to 19.2 lbs. and 49.6%, respectively, after treatment at a pH of 12.

*Example IV*

The procedure of Example I is followed in treating three more fabric samples, except that the temperature is maintained at 150° F. and the time of treatment in the colloidal solution at this temperature is varied to 5, 10 and 15 minutes. Best results, including breaking strength and percent elongation, as well as area shrinkage improvement, are obtained at the 10 minute level. Good results are obtained at the 5 and 15 minute levels, however, although the increase in improvement falls off slightly after 10 minutes of treatment.

*Example V*

The procedure of Example I is a repeated on five more samples, except that the temperature of the colloidal solution is maintained at 150° F. and the curing temperature is varied to 167°, 212°, 257°, 302° and 347° F., respectively. The least amount of area shrinkage is obtained in the fabrics cured at 257°, 302°, and 347° F. Substantial yellowing is noticed, however, in the latter two samples, and the extent of improvement at these levels is not as great as at 257° F.

As is shown in the above examples, substantial improvement in physical properties is most unexpectedly obtained when fabric is treated at a pH of about 12 in an aqueous dispersion of the fibrils at 160° F. for about ten minutes. Shrink resistance after this treatment is also quite good.

Any woolen material, such as the fibers per se, yarn, fabric-dyed or undyed, non-woven batts and the like, may be treated in accordance with this invention to provide excellent shrink resistance with no yellowing and with retention of, or even improvement in, the physical properties of the material.

Having thus described my invention, that which is claimed is:

1. The process of improving the shrink resistance of a woolen material comprising contacting, for at least about 0.5 minute and at a temperature between about 75° F. and 220° F., the woolen material with an aqueous medium containing at least about 0.02% by weight of fibrils of alumina monohydrate having the boehmite crystal lattice, said fibrils having adsorbed on their surfaces as a monolayer between about 5% and about 15% by weight of acetic acid, the pH of said aqueous medium being between about 9 and about 13, removing the woolen material from contact with the aqueous medium and curing said material at a temperature between about 150° and about 400° F.

2. The process of improving the shrink resistance of a woolen material comprising providing an aqueous medium containing at least about 0.02% by weight of fibrils of alumina monohydrate having the boehmite crystal lattice, said fibrils having adsorbed on their surfaces as a monolayer about 15% by weight of acetic acid; adjusting the pH of said aqueous medium to between about 9 and about 13; heating said medium to between about 120° F. and about 220° F.; immersing the woolen material in the medium for at least about 0.5 minute; removing said material from the aqueous medium, drying said material, and curing said material at a temperature between about 150° and about 260° F.

3. The process of claim 2 wherein the material is cured at a temperature between about 210° F. and about 260° F.

4. The process of claim 3 wherein the aqueous medium is maintained at the boil while the woolen material is immersed therein for no more than 10 minutes.

5. The process of claim 4 wherein the pH is adjusted to about 12 and the concentration of the fibrils in the aqueous medium is no more than about 0.03% by weight.

6. The process of claim 5 wherein the aqueous medium is heated to 160° F. rather than to the boil, and the material is treated at this temperature for no more than about 10 minutes.

References Cited in the file of this patent
UNITED STATES PATENTS
3,013,901    Bugosh _____ Dec. 19, 1961